US011923556B2

(12) United States Patent
Chen et al.

(10) Patent No.: US 11,923,556 B2
(45) Date of Patent: Mar. 5, 2024

(54) BATTERY PACK

(71) Applicant: Contemporary Amperex Technology Co., Limited, Fujian (CN)

(72) Inventors: Xingdi Chen, Ningde (CN); Kaijie You, Ningde (CN); Yongguang Wang, Ningde (CN); Yu Tang, Ningde (CN); Yanbo Chen, Ningde (CN); Long Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 11 days.

(21) Appl. No.: 16/827,224

(22) Filed: Mar. 23, 2020

(65) Prior Publication Data

US 2021/0066682 A1 Mar. 4, 2021

(30) Foreign Application Priority Data

Aug. 27, 2019 (CN) .......................... 201910794345.1

(51) Int. Cl.
*H01M 50/24* (2021.01)
*H01M 50/209* (2021.01)
(Continued)

(52) U.S. Cl.
CPC ......... *H01M 50/24* (2021.01); *H01M 50/209* (2021.01); *H01M 50/289* (2021.01); *H01M 50/103* (2021.01); *H01M 2220/20* (2013.01)

(58) Field of Classification Search
CPC .................................................. H01M 50/24
See application file for complete search history.

(56) References Cited

U.S. PATENT DOCUMENTS

| 5,392,873 A | 2/1995 | Masuyama et al. |
| 8,795,867 B2 | 8/2014 | Kim |
| (Continued) | | |

FOREIGN PATENT DOCUMENTS

| CN | 102104122 A | 6/2011 |
| CN | 205385056 U | 7/2016 |
| (Continued) | | |

OTHER PUBLICATIONS

European Examination Report issued in European Application No. 20165550.3, dated Mar. 2, 2021, 4 pages.

(Continued)

*Primary Examiner* — Maria Laios
*Assistant Examiner* — Jordan E Berresford
(74) *Attorney, Agent, or Firm* — Sterne, Kessler, Goldstein & Fox P.L.L.C.

(57) ABSTRACT

A battery pack for optimizing the structure of the battery pack includes a case, a battery module and a blocking member. The case includes an accommodating cavity and a drain hole in communication with the accommodating cavity. The battery module is contained inside the accommodating cavity. The blocking member is mounted to the case, and located between the drain hole and the battery module to block a binder for fixing the battery module from entering the drain hole. In the above-described technical solution, the blocking member can produce the effect of reducing or even avoiding binder for fixing the battery module from clogging in the drain hole.

17 Claims, 8 Drawing Sheets

(51) Int. Cl.
*H01M 50/289* (2021.01)
*H01M 50/103* (2021.01)

(56) References Cited

U.S. PATENT DOCUMENTS

2008/0193838 A1* 8/2008 Oh .................. H01M 50/24
429/175
2017/0187016 A1* 6/2017 Nagasato ............ H01M 50/545
2019/0319318 A1* 10/2019 Park ................ H01M 50/271

FOREIGN PATENT DOCUMENTS

| | | |
|---|---|---|
| CN | 107845751 A | 3/2018 |
| CN | 207338489 U | 5/2018 |
| CN | 207409544 U | 5/2018 |
| EP | 2 421 067 | 2/2012 |
| EP | 2 641 764 | 9/2013 |
| JP | 2000021438 A * | 1/2000 |
| JP | 2017137002 A | 8/2017 |

OTHER PUBLICATIONS

European Search Report for European Application No. 20165550.3, European Patent Office, Munich, Germany, dated Jul. 28, 2020, 7 pages.

* cited by examiner

BATTERY PACK

CROSS-REFERENCE TO RELATED APPLICATIONS

This application claims priority to Chinese Patent Application No. 201910794345.1 filed Aug. 27, 2019, the disclosures of which are hereby incorporated in their entirety by reference.

FIELD OF THE INVENTION

The present disclosure relates to the field of a battery, and in particular to a battery pack.

DESCRIPTION OF RELATED ART

In order to reduce the environmental pollution by gasoline and the like, batteries are widely applied in vehicles to provide electric drive for vehicles. In order to satisfy the high power requirement of the vehicle, the battery pack is generally used as a power source for the vehicle. The battery pack comprises a battery module, and a case for mounting the battery module, wherein the battery module is mounted inside the case.

The inventors have found that: in the case where there is water accumulated within the case, it is likely to cause short-circuit between the positive and negative electrodes of the battery module.

SUMMARY OF THE INVENTION

The present disclosure proposes a battery pack, for optimizing the structure of the battery pack.

The embodiments of the present disclosure provide a battery pack, comprising:

a case, comprising an accommodating cavity and a drain hole in communication with the accommodating cavity;

a battery module contained inside the accommodating cavity; and a blocking member mounted to the case, and located between the drain hole and the battery module to block a binder for fixing the battery module from entering the drain hole.

In some embodiments, the blocking member is located outside the battery module along a length direction.

In some embodiments, the blocking member and the drain hole are disposed at the same wall of the case.

In some embodiments, the blocking member comprises:
a connecting plate fixedly connected to the case; and
an upright plate connected to the connecting plate, wherein the upright plate extends along a height direction of the battery module.

In some embodiments, the connecting plate and the upright plate are integral.

In some embodiments, the connecting plate and the upright plate are connected to form an L-shaped plate.

In some embodiments, the blocking member has a length of L1, and there is a farthest distance of L2 between the side wall of the first drain hole and the side wall of the second drain hole, wherein L1 is greater than L2; the first drain hole and the second drain hole are two of the drain holes located at both ends of a row of drain holes adjacent to an end of the battery module in a length direction; the blocking member is configured to block a binder for fixing the battery module from entering the drain hole in a width direction of the case.

In some embodiments, the blocking member is provided adjacent to both ends of the battery module in the length direction.

In some embodiments, a reservoir cavity is provided below the battery module to store a liquid, and in communication with the drain hole; and the battery pack further comprises a reservoir portion disposed outside the case; the reservoir portion is provided with the reservoir cavity, or the reservoir portion and the case jointly form the reservoir cavity.

In some embodiments, the reservoir portion is mounted below a wall of the case and is sealingly connected with the wall; wherein the reservoir portion and the wall enclose the reservoir cavity.

In some embodiments, the reservoir portion is provided with an inner concave portion recessed in a direction away from the case.

In some embodiments, there are a plurality of the drain holes, and the inner concave portion is located outside all of the drain holes and covers all of the drain holes.

In some embodiments, the battery pack further comprises:
a protection portion mounted on one side of the reservoir portion away from the case.

In some embodiments, the protection portion has a hardness greater than that of the reservoir portion, and the protection portion entirely covers the reservoir portion.

In some embodiments, the case comprises:
a first case; and
a second case enclosing the accommodating cavity with the first case and located below the first case; wherein the drain hole is provided in the second case.

In some embodiments, the drain hole is plural and arranged along a width direction of the case.

In the above-described technical solution, the battery pack has a case and a battery module disposed inside an accommodating cavity of the case. During actual use of the battery pack, there might be liquid inside the accommodating cavity of the case. In order to prevent the liquid from contacting the positive and negative electrodes of the battery module to cause short-circuit in the battery module, the case of the battery module is provided with a drain hole in communication with the accommodating cavity of the case such that the liquid in the accommodating cavity may be discharged via the drain hole. Moreover, in the above-described technical solution, a blocking member is provided between the battery module and the drain hole. A binder is used to fix the battery module. When the binder is in an unsolidified state, the binder flows around when subjected to an external force and self-gravity. Since a blocking member is provided between the battery module and the drain hole, even if the binder flows around, when it flows to the position of the blocking member, it is blocked by the blocking member, so that it does not flow anymore. This effectively reduces or even avoids the occurrence of a phenomenon of binder clogging in the drain hole, so that the drain hole drains normally, thereby reducing the occurrence of a short-circuit phenomenon of the battery module caused by the circumstance that there is liquid accumulated inside the case, and improving the performance of the battery pack.

BRIEF DESCRIPTION OF THE DRAWINGS

The accompanying drawings described herein are used to provide a further understanding of the present disclosure and constitute a part of the present application. The illustrative embodiments of the present disclosure as well as the illustrations thereof, which are used for explaining the present disclosure, do not constitute improper definitions on the present disclosure. In the accompanying drawings.

DESCRIPTION OF THE INVENTION

The technical solution provided by the present disclosure will be described in more detail below in conjunction with FIGS. 1 to 14.

Figure 1:
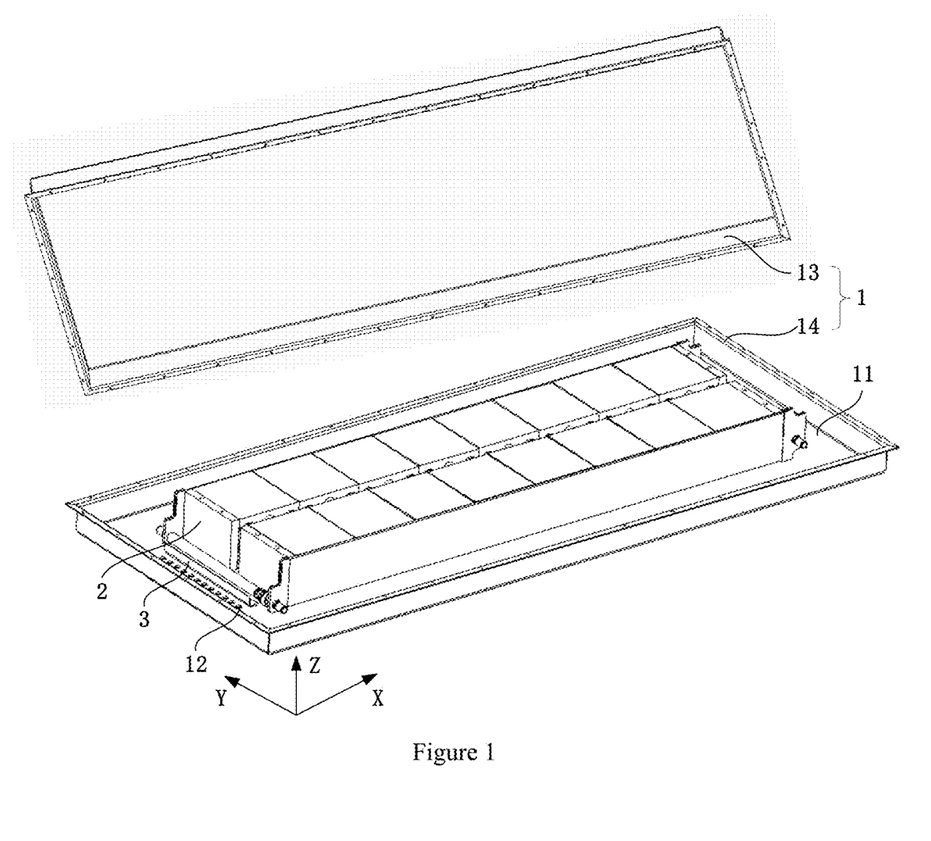
FIG. 1 is a schematic perspective structural view of a battery pack provided by some embodiments of the present disclosure.

In order to more clearly describe the technical solutions of various embodiments of the present disclosure, a coordinate system is established in FIG. 1, and subsequent descriptions of the respective orientations of the battery pack are made based on the coordinate system. Referring to FIG. 1, the X-axis is a length direction of the battery pack. The Y axis is perpendicular to the X axis within a horizontal plane, and the Y axis represents a width direction of the battery pack. The Z axis is perpendicular to a plane formed by the X axis and the Y axis, and the Z axis represents a height direction of the battery module. In the description of the present disclosure, the terms "above" and "below" are both defined relative to the Z-axis direction. The length direction of the case 1 coincides with that of the battery pack, the width direction of the case 1 coincides with that of the battery pack, and the height direction of the case 1 coincides with that of the battery pack.

In the description of the present disclosure, it is necessary to understand that, the azimuth or positional relations indicated by the terms "top", "bottom", "within", "outside", which are based on the azimuth or positional relations illustrated by the drawings, are only for facilitating description of the present disclosure and simplifying the description, rather than indicating or implying that the device or element referred thereto has to present a particular azimuth, and be constructed and operated in a particular azimuth, so that it cannot be understood as limiting the protected content of the present disclosure.

Figure 2:
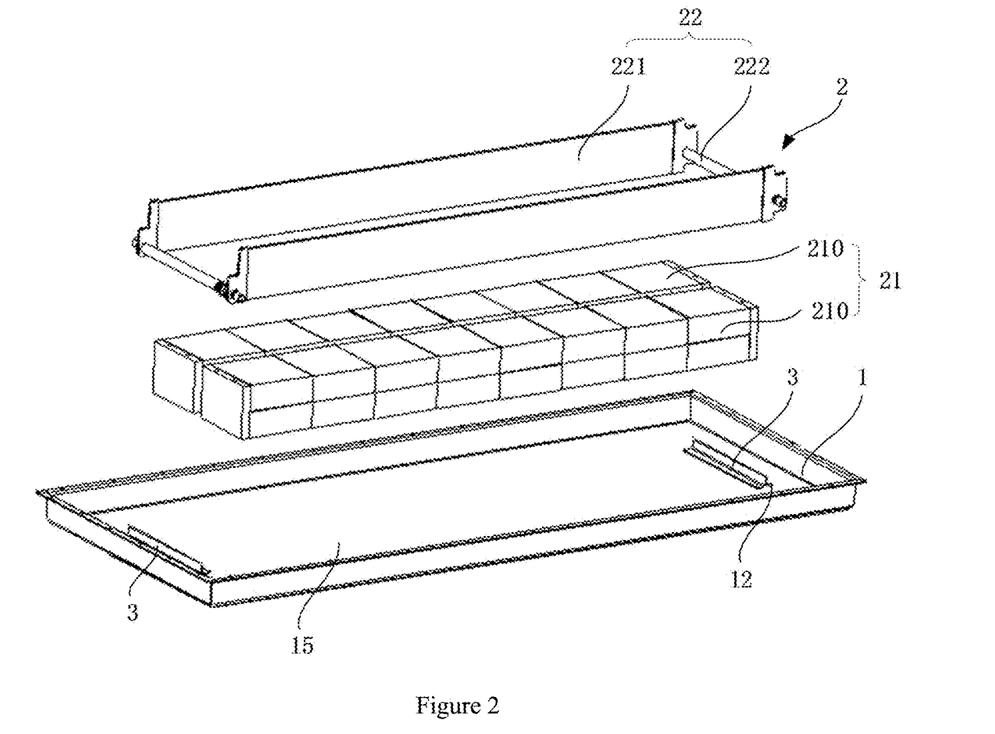
FIG. 2 is a schematic exploded structural view of a battery pack provided by some embodiments of the present disclosure.

Referring to FIG. 1, FIG. 1 shows a schematic partial perspective structural view of the battery pack, in which the case 1 is in an open state. Referring to FIG. 2, one lateral wall of the second case 14 of the case 1 described later is removed in FIG. 2 to clearly show the structure of the battery module 2 inside the case 1 as well as the positional relationship between the battery module 2 and the second case 14.

Referring to FIGS. 1 to 4, the embodiments of the present disclosure provide a battery pack, which comprises a case 1, a battery module 2 and a blocking member 3. The case 1 comprises an accommodating cavity 11 and a drain hole 12 in communication with the accommodating cavity 11. The battery module 2 is mounted inside the accommodating cavity 11. The blocking member 3 is mounted to the case 1, and located between the drain hole 12 and the battery module 2 to block a binder for fixing the battery module 2 from entering the drain hole 12.

In some embodiments, a reservoir cavity 10 for storing a liquid is provided below the battery module 2, and in communication with the drain hole 12. The term "below" mentioned here may be immediately below or obliquely below, as long as the liquid inside the accommodating cavity 11 can flow through the drain hole 12 into the reservoir cavity 10 under the effect of gravity.

The reservoir cavity 10 is located inside the case 1, or outside the case 1. In some embodiments, the reservoir cavity 10 is entirely located inside the case 1. In some embodiments the reservoir cavity 10 is entirely outside the case 1.

In the above-described technical solution, the battery pack is provided with a reservoir cavity 10, which is located below a gravity direction of the battery module 2. If there is liquid accumulated within the accommodating cavity 11, the accumulated liquid flows downward under the effect of gravity, to the drain hole 12, and into the reservoir cavity 10 via the drain hole 12 for storage. In the above-described technical solution, since the reservoir cavity 10 is disposed below the battery module 2, the short-circuit phenomenon of the battery module 2 caused when there is liquid within the accommodating cavity 11 is reduced or even avoided, thereby improving the operational reliability of the battery pack.

The positional relationships between the structures of various members will be described in detail below.

First, referring to FIGS. 1 to 7, the case 1 will be introduced. In some embodiments, the case 1 comprises a first case 13 and a second case 14. The second case 14 encloses the accommodating cavity 11 with the first case 13. The second case 14 is located below the first case 13; wherein the drain hole 12 is disposed in the second case 14.

The first case 13 and the second case 14 are locked together to form the above-described accommodating cavity 11. In some embodiments the first case 13 and the second case 14 use other detachable connection means such as bolt connection. That is, the case 1 is formed by a mosaic of two case portions comprising the first case 13 and the second case 14. The height dimension of the first case 13 is the same as or different from that of the second case 14. In use, the case 1 is formed by a mosaic of two case portions, which on the one hand facilitates mounting, replacing, repairing and servicing various members within the accommodating cavity 11 of the case 1, and on the other hand also makes it easier to manufacture and machine the case 1.

Referring to FIG. 1, the case 1 is configured to mount the battery module 2. The case 1 is fixed to the battery module 2 by binder. For example, the case 1 is coated with a structural binder, and then the battery module 2 is placed. After the binder is cured, the battery module 2 is glued to the case 1. By using the above-described implementation, the connection between the battery module 2 and the case 1 is stable and reliable, and the structure of the battery pack is simplified, thereby improving the energy density of the battery pack.

In some embodiments, the drain hole 12 is disposed at the bottom of the second case 14. If there is liquid accumulated inside the accommodating cavity 11, the liquid within the accommodating cavity 11 flows out of the accommodating cavity 11 via the drain hole 12 under the effect of self-gravity, thereby effectuating automatic draining of the liquid accumulated within the accommodating cavity 11.

Figure 12:
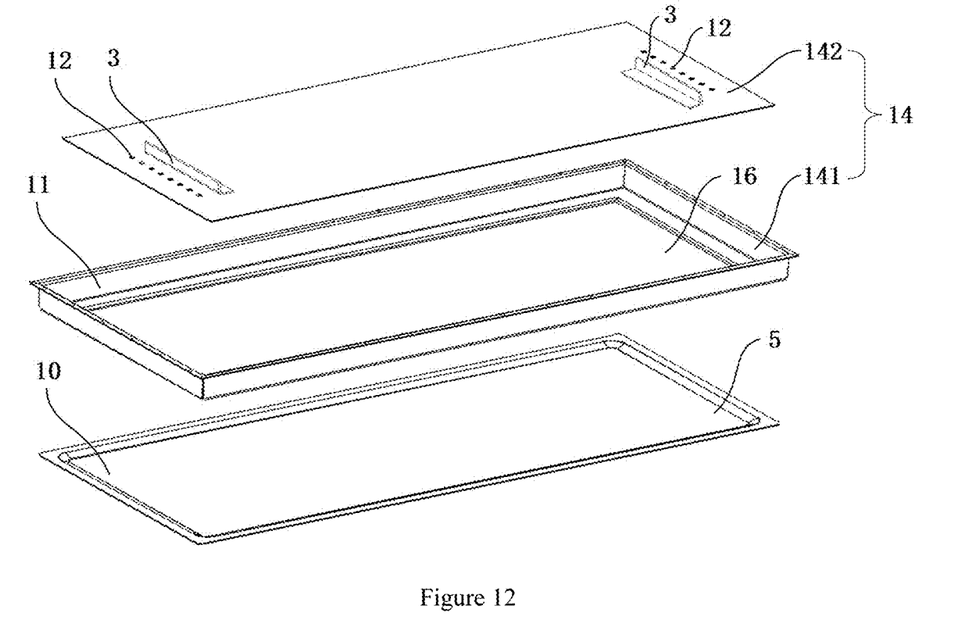
FIG. 12 is a schematic exploded structural view of a carrier, a second case, a blocking member and a protection portion of a battery pack provided by some embodiments of the present disclosure.
Figure 13:
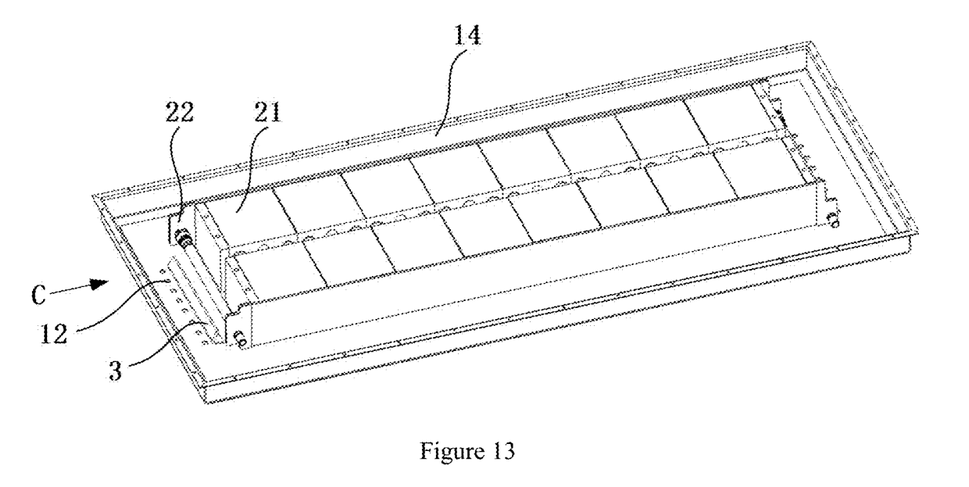
FIG. 13 is a schematic partial perspective structural view of a battery pack provided by some embodiments of the present disclosure.
Figure 14:
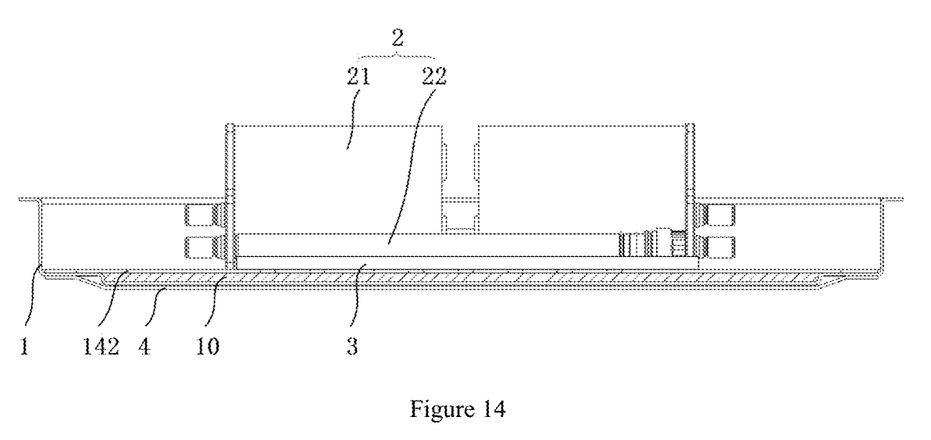
FIG. 14 is a schematic partial cross-sectional view along a C direction in FIG. 13.

Referring to FIGS. 12 to 14, in other embodiments, the second case 14 comprises a case body 141 and a carrier 142. The carrier 142 is disposed inside the case body 141. The carrier 142 divides an inner space of the case 1 into an accommodating cavity 11 and a reservoir cavity 10; the carrier 142 is provided with the drain hole 12, and the battery module 2 is carried by the carrier 142. The blocking member 3 is mounted to the carrier 142. The blocking member 3 and the drain hole 12 are both disposed at the carrier 142, and the battery module 2 is also mounted to the carrier 142 and carried by the carrier 142. In the above-described technical solution, the blocking member 3 effectively prevents the binder from flowing from the surface of the carrier 142 to the drain hole 12 when the battery module 2 is mounted.

In some embodiments, a bottom of the case body 141 is provided with an inner concave area recessed in a direction away from the first case 13, and the carrier 142 is connected with an edge of the inner concave area.

Figure 3:
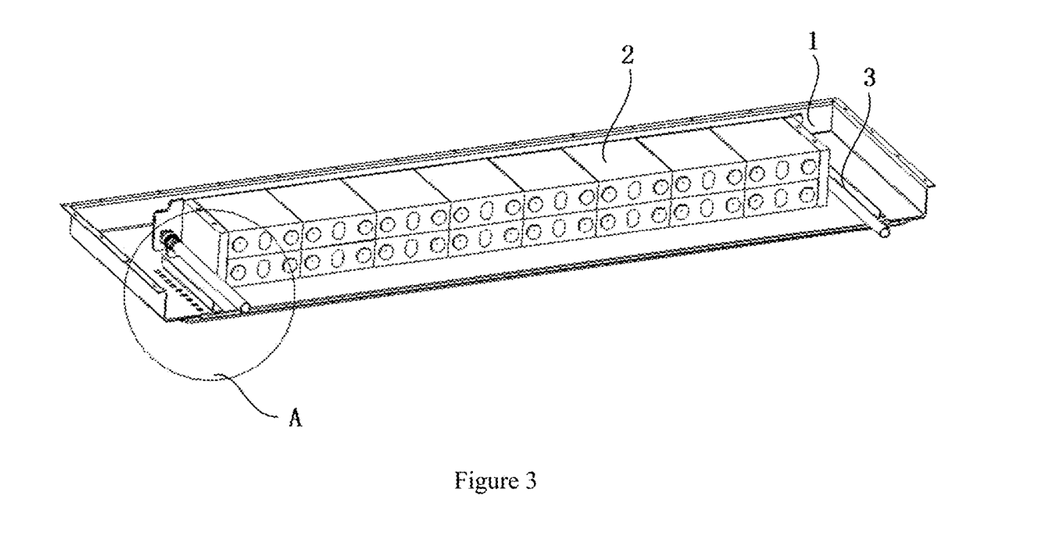
FIG. 3 is a schematic partial perspective structural view of a battery pack provided by some embodiments of the present disclosure.
Figure 4:
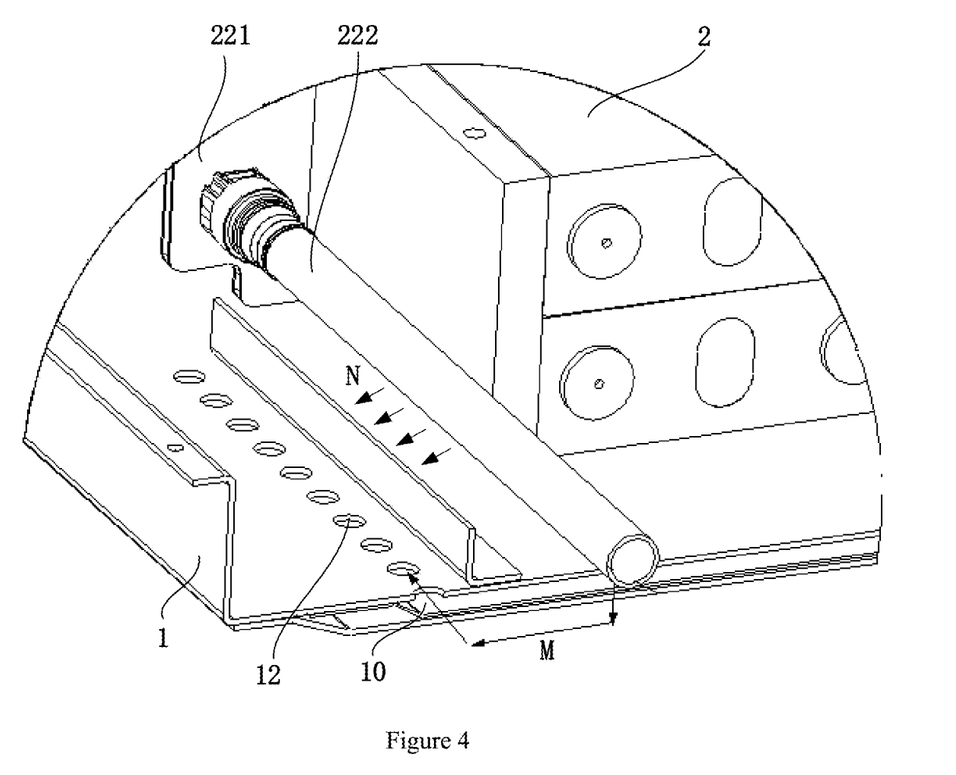
FIG. 4 is a partially enlarged schematic view of A in FIG. 3.
Figure 5:
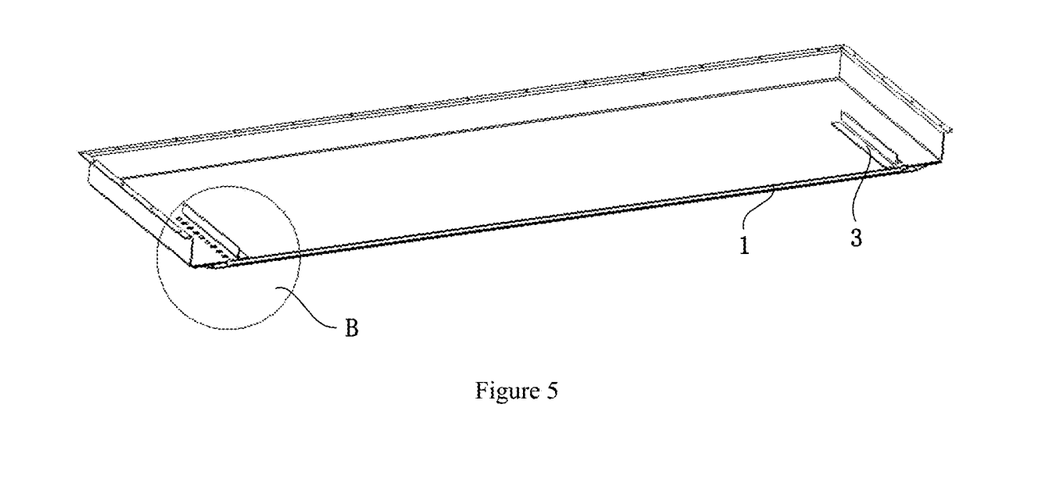
FIG. 5 is a schematic partial structural view of partial members of a battery pack provided by some embodiments of the present disclosure.

Referring to FIGS. 1, 3 and 4, the relevant content of the battery module 2 will be introduced below.

In some embodiments, the battery module 2 comprises a battery cell assembly 21 and a cooling system 22. The battery cell assembly 21 comprises a plurality of battery cells 210 arranged side by side. The plurality of battery cells 210 are electrically connected to each other. The cooling system 22 abuts against the plurality of battery cells 210. The cooling system 22 is filled with a liquid for cooling, such that the cooling system 22 cools each of the battery cells 210. There might be a leakage phenomenon at the connection of various members of the cooling system 22. Wherein, the drain hole 12 is configured to discharge the liquid leaked by the cooling system 22, so that there is seldom or even no liquid accumulated inside the case 1, thereby reducing or even eliminating the short-circuit risk of the battery pack.

Referring to FIGS. 1 to 4, the battery module 2 comprises a plurality of battery cell assemblies 21, which are provided to be connected in series, in parallel or in series and parallel for the electrical connection manner therebetween, so as to realize the electrical properties required for the battery pack.

Figure 9:
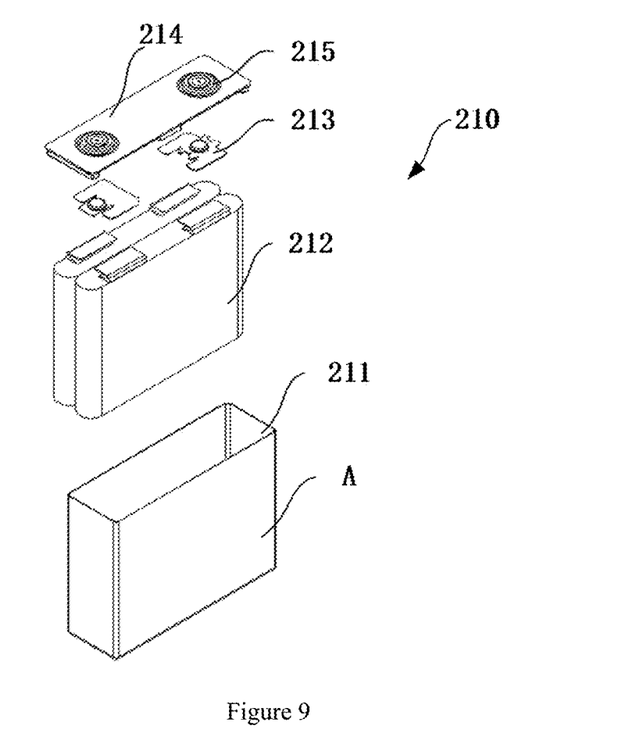
FIG. 9 is a schematic structural view of a battery cell of a battery pack provided by some embodiments of the present disclosure.

Referring to FIG. 9, the battery cell 210 comprises a housing 211, an electrode assembly 212 disposed within the housing 211, a connecting member 213 disposed at an end of the electrode assembly 212, and a cover place 214 connected to the housing 211. The cover plate 214 is provided with an electrode terminal 215.

The housing 211 is closed at one end and open at the other end. The cover plate 214 is disposed at an opening of the housing 211. The electrode assembly 212 is mounted to an interior of the housing 211 via the opening. The maximum lateral surface of the electrode assembly 212 and that of the housing 211 face towards each other, and the maximum lateral surface of the housing 211 serves as the maximum lateral surface of the battery cell.

Figure 10:
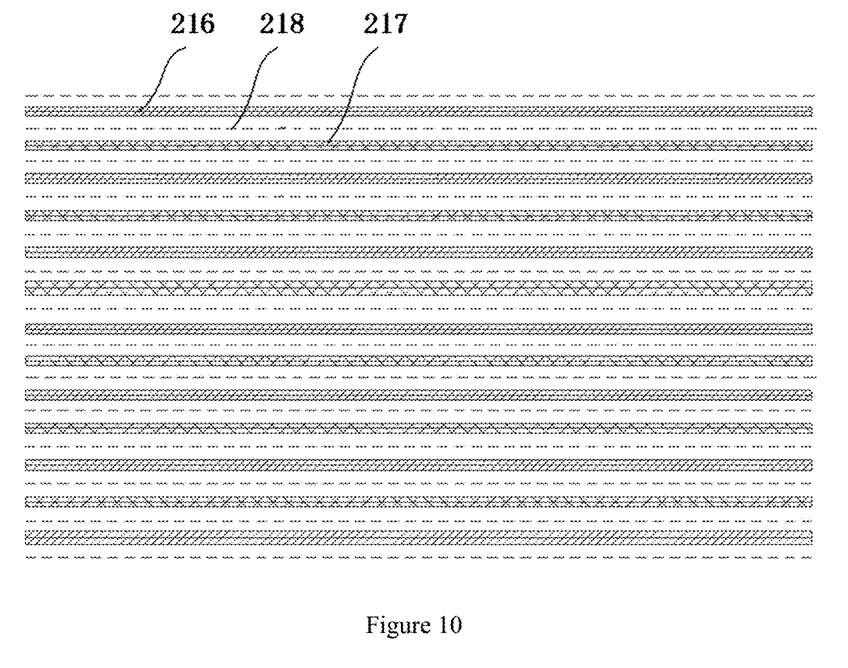
FIG. 10 is a schematic structural view of a laminated electrode assembly.
Figure 11:
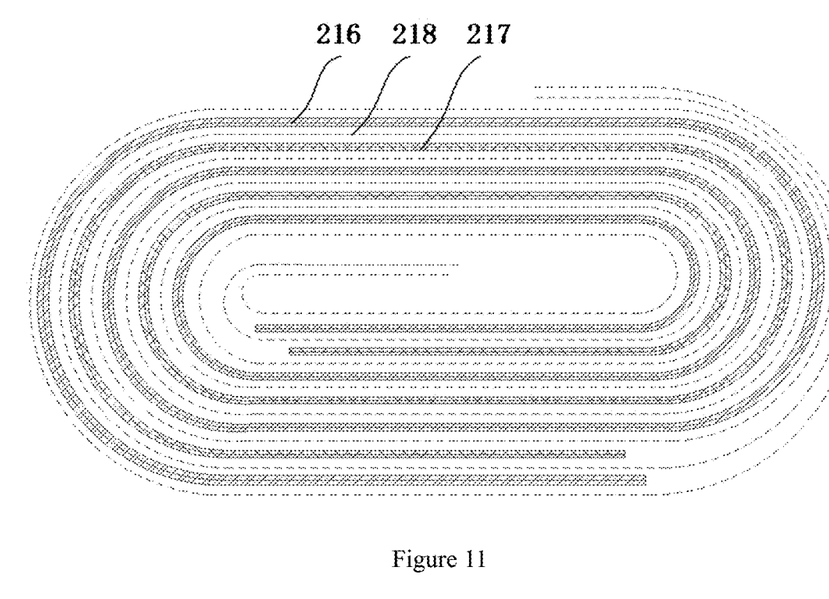
FIG. 11 is a schematic structural view of a wound electrode assembly.

The manufacturing manner of the electrode assembly 212 comprises a laminated manner and a wound manner. As shown in FIG. 10, the laminated electrode assembly 212 is to tailor the positive electrode tab 216, the negative electrode tab 217, and the diaphragm 218 into a size having a specified dimension, and subsequently laminate the positive electrode tab 216, the diaphragm 218, and the negative electrode tab 217 into the electrode assembly 212. As shown in FIG. 11, the wound electrode assembly 212 is to wind the positive electrode tab 216, the negative electrode tab 217, and the diaphragm 218 to form a shape.

The maximum surface of the laminated electrode assembly 212 and the wound electrode assembly 212 is the surface having the largest expansion deformation. As shown in FIGS. 1 and 2, the maximum expansion surface of the battery cell 210 is provided towards the Z-axis direction. It is possible to effectively reduce the accumulated expansion of the battery cell assembly 21 and further reduce the accumulated expansion of the battery pack since the maximum expansion deformation of the battery cell 210 is along the Z-axis direction, and the dimension of the battery module 2 along the Z-axis direction is smaller than the dimension along the X-axis or the Y-axis direction.

Referring to FIGS. 1, 2 and 3, the arrangement manners of the respective battery cells 210 of the battery cell assembly 21 will be introduced below.

Referring to FIGS. 1, 2 and 3, in some embodiments, each of the battery cells 210 of the battery module 2 is arranged along a length direction of the case 1, and a maximum lateral surface of each of the battery cells 210 and the wall 15 in which the drain hole 12 of the case 1 is located face towards each other.

As shown in FIG. 2, a plurality of battery cells 210 are arranged flat along the length direction X of the case 1. That is, the largest lateral surface A of the battery cell 210 is substantially parallel to the length direction X of the case 1, and the largest lateral surface A of the battery cell 210 and the wall 15 of the case 1 face towards each other.

As shown in FIG. 1, two rows of battery cell assemblies 21 are provided along a width direction, i.e., the Y-axis direction, of the battery pack. In actual application, three rows or more may be also provided. In actual use, one or more layers of battery cell assemblies 21 may also be provided in the height direction of the battery pack, that is, in the Z-axis direction in FIG. 1, as necessary.

The placing manner in which the largest lateral surface A of the battery cell 210 and the wall 15 of the case 1 face towards each other is also referred to be laid flat. By using such an arrangement manner as to be laid flat, since the battery cell assembly 21 has a relatively short height in the Z direction, to reduce the overall height of the battery pack, the battery pack having such structure is more suitable for a vehicle having a relatively short space for mounting the battery pack. However, since the battery cell assembly 21 has a short height, the bus bar of the battery cell 210 is also in a low position, and the electrode terminal 215 is relatively closer to the bottom of the case 1. If the structure of the embodiments of the present disclosure is not employed, if there is leakage in the cooling system 22 inside the case 1 or liquid accumulated within the case 1, the battery cell 210 that is laid flat is more likely to be subjected to a short-circuited phenomenon.

If the above-described structure of the embodiments of the present disclosure is employed, the above-described two problems are favorably balanced, so that the battery pack have a relatively short height to meet the vehicle installation requirements; and also the battery pack is less likely to be subjected to a short-circuited phenomenon inside, thereby improving the performance of the battery pack. Since the battery pack has the reservoir portion 4 in communication with the accommodating cavity 11 via the drain hole 12, and the liquid accumulated within the accommodating cavity 11 readily flow out of the accommodating cavity 11 through the drain hole 12, thereby effectively reducing a possibility of a water accumulation phenomenon within the case 11, reducing and even avoiding a possibility of a short-circuit phenomenon in the battery module, and improving the performance and structure of the battery pack.

In addition, by using the above-described arrangement manner, each of the battery cells 210 of the battery module 2 is laid flat. Since the maximum expansion deformation of each of the battery cells 210 comprised in the battery cell assembly 21 is along the Z-axis direction, there is less accumulated expansion of each of the battery cells 210, thereby optimizing the performance of the battery pack.

Referring to FIGS. 1 to 4, the relevant content of the cooling system 22 of the battery module 2 will be introduced below.

The cooling system 22 is disposed outside the battery cell assembly 21, and configured to cool the battery cell assembly 21. Alternatively, the cooling system 22 cools the bottom surface of the battery cell assembly 21. The bottom surface of the battery cell assembly 21 refers to a surface of each of the battery cells 210 comprised in the battery cell assembly 21 facing the top surface provided with the electrode terminal 215.

Referring to FIGS. 1 and 2, in some embodiments, two rows of battery cell assemblies 21 share a set of cooling system 22. As shown in FIG. 1, the top surfaces of the two rows of battery cell assemblies 21 provided with the electrode terminals 215 are opposite to each other, and the cooling system 22 is configured to simultaneously cool the bottom surfaces of the two rows of battery cells. Alternatively, the top surfaces of the two rows of battery cells provided with the electrode terminals 215 are away from each other. The bottom surfaces of each of the battery cells 210 of the two rows of battery cell assemblies 21 are arranged oppositely, with a gap between the two rows of battery cell assemblies 21, and the cooling plate 221 of the cooling system 22 is disposed at the gap to simultaneously cool the bottom surfaces of the two rows of battery cell assemblies 21.

Referring to FIGS. 1 to 4, to continue with the above-described, in some embodiments, the cooling system 22 comprises a cooling plate 221 and a connecting pipe 222. The cooling plates 221 are internally provided with cooling flow passages, and have a number of two or more. The connecting pipe 222 is connected with the cooling plate 221 to communicate the cooling flow passages of each of the cooling plates 221. Wherein, the drain hole 12 is adjacent to a connection of the cooling plate 221 and the connecting pipe 222. The arrow N in FIG. 4 shows a flow direction of the binder, and the arrow M shows a flow direction of the condensed water.

In some embodiments, a feeding pipe and a draining pipe are additionally provided outside the case 1, and the cooling system 22 is in communication with both the feeding pipe and the draining pipe. The structure realizes the circulation of a coolant inside the cooling system 22, so that there is a favorable cooling effect of the battery pack.

Referring to FIGS. 1 and 3, the cooling system 22 comprises two connecting pipes 222, which are respectively located on both sides of the battery module 2 in a length direction. One or more rows of drain holes 12 are provided below a connection position of each of the connecting pipes 222 and the cooling plate 221. If there is leakage at the connection between the connecting pipe 222 and the cooling plate 221, the drain hole 12 readily drain the accumulated liquid to ensure normal use of the battery module 2 inside the case 1.

Referring to FIGS. 1 to 4, the cooling system 22 is disposed between the two end surfaces of the battery cell assembly 21, that is, one of the two cooling plates 221 of the cooling system 22 cools the bottom surface of one battery cell assembly 21, and the other cooling plate 221 cools the bottom surface of the other battery cell assembly 21. The above-described arrangement implements using one set of cooling system 22, and simultaneously cooling the two battery cell assemblies 21, thereby reducing the number of the cooling members and making a lightweight structure of the battery pack.

Referring to FIGS. 1 to 6, the relevant content of the drain hole 12 will be further introduced in detail below.

The battery module 2 is integrally mounted to one of the walls of the case 1, which is referred to as a wall 15. The drain hole 12 is also disposed in the wall 15 of the case 1. Taking the direction shown in FIG. 1 as an example, the wall 15 is the bottom wall of the second case 14. Further, the drain hole 12 is located below a gravity direction of the battery module 2.

Taking the direction shown in FIG. 1 as an example, the drain hole 12 is disposed at the bottom of the case 1, so that the liquid directly flows towards the drain hole 12 under the effect of gravity and then into the reservoir cavity 10 if there is leakage in the cooling system 22 inside the case 1 described later. The flow path of the liquid is illustrated by the path M in FIG. 4.

Figure 6:
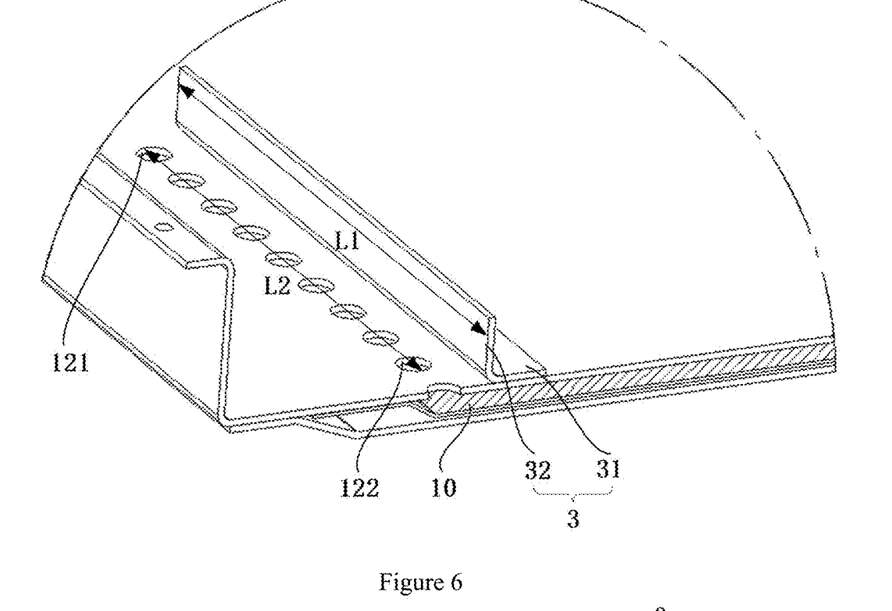
FIG. 6 is a partially enlarged schematic view of B in FIG. 5.

Referring to FIGS. 1 and 6, in some embodiments, the drain holes 12 are arranged in rows in the wall 15 of the case 1, and the drain holes 12 penetrate through the wall 15. Specially, the drain holes 12 arranged in rows are arranged along a width direction of the case 1.

The drain hole 12 is, for example, a circular hole, a trapezoidal hole, an irregular hole, or the like. The shape of the drain hole 12 is not limited, with a function of enabling the accumulated liquid to pass through and flow into the reservoir cavity 10. The drain hole 12 having a circular hole shape is used to facilitate the machining and manufacturing. The drain hole 12 having a trapezoidal hole is used, and the dimension at one end of the drain hole 12 in communication with the accommodating cavity 11 is greater than the dimension at the other end of the drain hole 12 in communication with the reservoir cavity 10. The structure effectively reduces a possibility of backflow of liquid within the reservoir cavity 10. The drain hole 12 having an irregular hole is used to implement designing the structure, shape and dimension of the drain hole 12 as necessary, so as to satisfy the personalized communicating requirements.

In some embodiments, the drain hole 12 is configured to allow liquid to flow unidirectionally from the drain hole 12 to the reservoir cavity 10. In some embodiments, the drain hole 12 is provided with a direction regulating member that allows liquid to flow unidirectionally from the drain hole 12 to the reservoir portion 4.

Specifically, for example, the drain hole 12 is provided in an abnormal structure, or has a dimension at one end greater than the dimension at the other end. In some embodiments, a film that prevents the backflow is provided at an end of the drain hole 12 to prevent the backflow.

In some embodiments, the dimension of the opening at one end of the drain hole 12 in communication with the accommodating cavity 11 is greater than the dimension of the opening at the other end in communication with the reservoir cavity 10. The end having a larger dimension is located upstream of the gravity direction, and the end having a smaller dimension is located downstream of the gravity direction. This structure makes it difficult for the liquid to flow back into the case 1 via the drain hole 12 when the case 1 is inverted.

By the above-described arrangement, after the liquid accumulated within the accommodating cavity 11 of the case 1 flows out into the reservoir cavity 10 via the drain hole 12, the liquid in the reservoir cavity 10 is also less likely to turn around into the accommodating cavity 11 during the use of the battery pack even if there are accidental conditions such as collision and impact, thereby reducing the short-circuit of the battery module 2 resulting from the backflow of the liquid in the reservoir cavity 10 to the accommodating cavity 11, optimizing the structure of the battery pack, and improving the performance of the battery pack.

Referring to FIGS. 1 to 7, the relevant content of the position and structure of the blocking member 3 will be introduced below.

In some embodiments, the blocking member 3 is located outside the battery module 2 along a length direction.

The battery module 2 is fixed onto the inner wall of the case 1 by binder. When the binder is not solidified, the binder which is squeezed by the gravity of the battery module 2 and the external force, flows around. The blocking member 3 is disposed between the battery module 2 and the drain hole. If the binder flows to the position of the blocking member 3, it is blocked by the blocking member 3, so that it does not continue to flow forward into the drain hole 12. The above-described technical solution effectively prevents the binder from flowing into the drain hole 12 and clogs the drain hole 12, so that the drain hole 12 drains normally afterwards, thereby reducing a short-circuit phenomenon of the battery module 2 caused by the circumstance that there is liquid accumulated inside the case 1, and improving the performance of the battery pack.

The blocking member 3 is provided at both ends of the battery module 2 in the length direction. The above-described structure enables the blocking member 3 to produce a blocking effect regardless of an end of the battery module 2 in a length direction towards which the binder flows. By using the above-described technical solution, the drain hole 12 located at any end the battery module 2 in a length direction is less likely to be clogged by the binder, thereby ensuring a draining effect of the drain hole 12.

In some embodiments, the blocking member 3 and the drain hole 12 are disposed at the same wall 15 of the case 1.

The blocking member 3 is fixed on the wall 15 of the case 1, and the wall 15 is a bottom wall of the second case 14. The blocking member 3 is completely fitted to the bottom wall without a gap therebetween. The battery module 2 is also mounted on the bottom wall. Since the binder is applied to the bottom wall and is likely to flow around along the bottom wall, the blocking member 3 is also mounted to the bottom wall, so that it is possible to effectively prevent entry of the binder into the drain hole 12.

Referring to FIGS. 1 and 6, in some embodiments, the blocking member 3 comprises a connecting plate 31 and an upright plate 32. The connecting plate 31 fixedly connected to the case 1, for example by welding or riveting. The structure of the connecting plate 31 is, for example, a flat plate or other irregular structures having a plane attached to the bottom wall. The upright plate 32 is mounted on one side of the connecting plate 31 facing towards the top of the case 1. The upright plate 32 extends along a height direction of the case 1, that is, the upright plate 32 has a certain height to prevent the binder from flowing into the drain hole 12 over the top of the upright plate 32. The above-described technical solution also provides a favorable blocking effect in the case where there is a relatively large amount of flowing binder, thereby effectively ensuring normal operation of the drain hole 12.

The connecting plate 31 and the upright plate 32 are connected in multiple manners, for example by welding, splicing. In some embodiments, the connecting plate 31 and the upright plate 32 are integral.

In some embodiments, the connecting plate 31 and the upright plate 32 are connected to form an L-shaped panel. In an actual manufacturing process, for example, a flat plate is used and bent to form the blocking member 3.

The drain holes 12 are, for example, plural. A row of drain holes 12 are provided at each end of the battery module 2 in a length direction. It is possible to use a plurality of blocking members 3 to jointly block the binder from flowing to these drain holes 12, and it is also possible to use a relatively long blocking member 3 to block the binder from flowing to these drain holes 12. Specifically, the length of the blocking member 3 satisfies the following relationship, as shown in FIG. 6: L1 is greater than L2. Wherein, the blocking member 3 has a length of L1, and L2 is the farthest distance between the sidewalls of the first drain hole 121 and the second drain hole 122. The first drain hole 121 and the second drain hole 122 are two of a row of drain holes 12 closest to the edges. The blocking member 3 is configured to block a binder for fixing the battery module 2 from entering the drain hole 12 in a width direction of the case 1.

Referring to FIG. 1, in some embodiments, the blocking member 3 is provided on each side of the battery module 2 in the width direction. There are two blocking members 3, with one arranged at each end of the battery module 2 in a length direction. The above-described technical solution is very compact in structure, and favorably prevents the drain hole 12 from being clogged by the binder.

Next, referring to FIG. 1, multiple implementations of the reservoir cavity 10 will be introduced.

Divided according to the position of the reservoir cavity 10, in some embodiments the reservoir cavity 10 is located inside or outside the case 1, or partially inside the case 1, and partially outside the case 1. The reservoir cavity 10 does not communicate with the exterior of the battery pack to prevent external liquid or moisture from flowing into the interior of the accommodating cavity 11 via the reservoir cavity 10, thereby ensuring the reliability performance of the battery pack.

In some embodiments, the battery pack further comprises a reservoir portion 4 disposed outside the case 1. The reservoir portion 4 is provided with the reservoir cavity 10, or the reservoir portion 4 and the case 1 jointly form the reservoir cavity 10.

Figure 7:
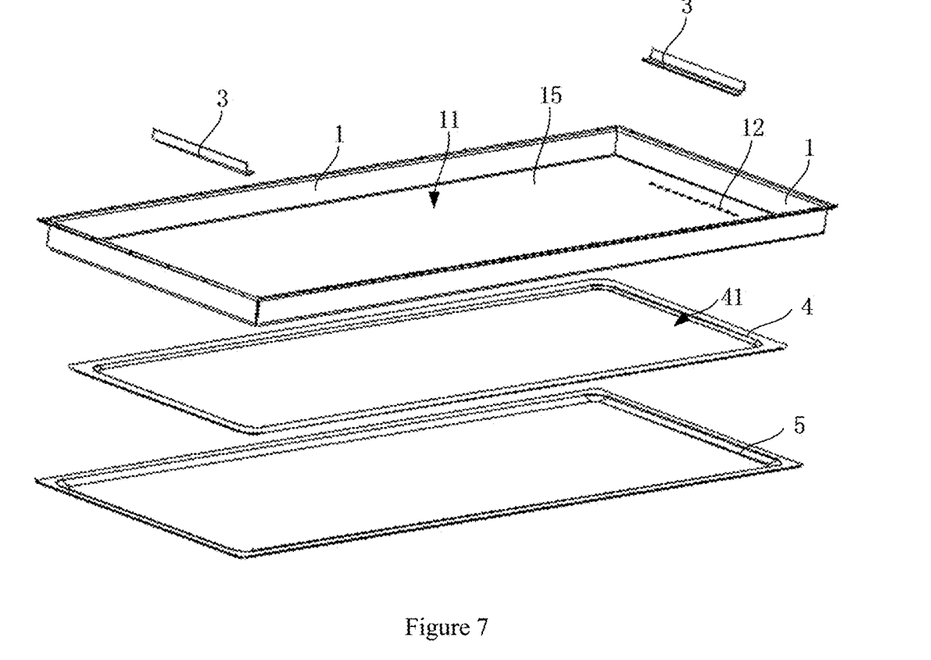
FIG. 7 is a schematic exploded structural view of partial members of a battery pack provided by some embodiments of the present disclosure.
Figure 8:
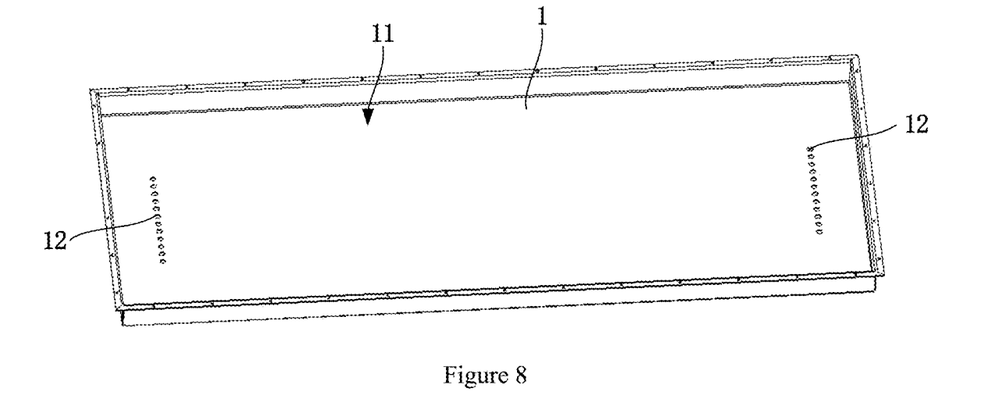
FIG. 8 is a schematic perspective structural view of a case of a battery pack provided by some embodiments of the present disclosure.

Referring to FIGS. 1, 6 and 7, the reservoir portion 4 is located outside the bottom of the case 1, and the reservoir portion 4 and the wall 15 of the case 1 are fixed together.

If the reservoir portion 4 is separately provided with the reservoir cavity 10, the reservoir portion 4 and the case 1 are also sealingly connected therebetween, so that the reservoir cavity 10 communicates with the drain hole 12, and there is no liquid leakage from the connection between the reservoir portion 4 and the case 10. The manner of implementing sealingly connecting the reservoir portion 4 and the case 1 is for example in a way such that both of them are sealingly connected directly, or for example to implement a sealed connection by providing the sealing structures that are mated with each other. In some embodiments, a sealing member is sandwiched between the reservoir portion 4 and the case 1, such that the reservoir portion 4 is sealingly connected to the case 1 by the sealing member.

If the reservoir portion 4 and the case 1 jointly form the reservoir cavity 10, the reservoir portion 4 and the case 1 also need to be sealingly connected. There are multiple sealed connection manners. One alternative manner is that the reservoir portion 4 is sealingly connected to the case 1 directly. Another manner is that a sealing member is sandwiched between the reservoir portion 4 and the case 1, such that the reservoir portion 4 is sealingly connected to the case 1 by the sealing member. The sealing member is, for example, a sealing ring or the like. In the above-described implementation, the reservoir portion 4 is sealingly connected to the case 1, so that the liquid within the accommodating cavity 11 does not leak via the connection between the reservoir portion 4 and the case 1, thereby improving the performance of the battery pack. Moreover, external liquid and moisture may not flow into the interior of the accommodating cavity 11 via the reservoir cavity 4, thereby ensuring the reliability performance of the battery pack.

As can be seen from the above-described introduction, if the reservoir cavity 10 is formed outside the case 1, the wall 15 and other portions of the second case 14 (i.e., the side walls of the second case 14) are sealingly connected or not. The entire case 14 is sealed mainly by the reservoir portion 4 to prevent foreign moisture and liquid from entering the case 1. It is due to the above-described plural possibilities in the connection relationship between the wall 15 and other portions of the second case 14, that the second case 14 is integrally molded, and also use a split structure, for example formed by welding or riveting a plurality of plates.

When the reservoir portion 4 is located outside the case 1, the reservoir portion 4 may form the reservoir cavity 10 in the following two manners:

The first is that the reservoir portion 4 itself has a structure of a closed cavity which has an inflow port in communication with the drain hole 12. The closed cavity serves as the reservoir cavity 10. In the above-described technical solution, the reservoir portion 4 is a separate member, and separately forms the reservoir cavity 10. At the time of installation, the reservoir portion 4 is sealingly fixed to the case 1, such that the reservoir cavity 10 communicates with the drain hole 12 to prevent leakage of liquid from the drain hole 12 to an area other than the reservoir cavity 10.

The second implementation is that: the reservoir portion 4 and the case 1 jointly form the reservoir cavity 10.

Referring to FIGS. 1 and 7, in some embodiments, the reservoir portion 4 is mounted outside the wall 15 of the case 1 provided with the drain hole 12, and sealingly connected to the wall 15. Wherein, the reservoir portion 4 and the outside of the wall 15 enclose the reservoir cavity 10.

When the reservoir portion 4 and the wall 15 jointly form the reservoir cavity 10, the sealed connection manner of the reservoir portion 4 and the wall 15 is similar to the sealed connection method introduced above, and thus will not be described in detail here, and thus will no longer be described in detail here. In the above-described implementation, the reservoir portion 4 is sealingly connected to the wall 15, so that the liquid within the accommodating cavity 11 does not leak via the connection between the reservoir portion 4 and the wall 15, thereby improving the performance of the battery pack.

Specifically, referring to FIGS. 1 and 7, the reservoir portion 4 is provided with an inner concave portion 41 recessed in a direction away from the case 1, wherein the inner concave portion 41 encloses the reservoir cavity 10 with the wall 15.

In some embodiments, the inner concave portion 41 is for example plural, and a plurality of inner concave portions 41 jointly cover all of the drain holes 12.

In some embodiments, the inner concave portions 41 are located outside all of the drain holes 12. That is, the inner concave portions 41 entirely cover all of the drain holes 12, so that the liquid within the drain hole 12 entirely flows to the reservoir cavity 10.

The inner concave portion 41 provided in one of the reservoir portions 4 is, for example, plural, and a plurality of inner concave portions 41 of the same reservoir portion 4 are in communication or not in communication.

In some embodiments, the material of the reservoir portion 4 comprises plastic. The plastic material which has a favorable deformation property, effectively absorb energy, and reduce a possibility of a sealing failure when subjected to a collision.

In some embodiments, the volume of the reservoir cavity 10 is greater than or equal to the capacity of the coolant in the cooling system 22. If the above-described arrangement causes a very serious leakage in the cooling system 22, the battery module 2 will not be soaked in the liquid as well, thereby enhancing the operational reliability of the battery pack.

Referring to FIGS. 1 to 7, in some embodiments, the reservoir portion 4 further comprises a protection portion 5 mounted on one side of the reservoir portion 4 away from the outside surface.

The protection portion 5 is, for example, a plate-like structure provided with an inner concave structure mated with the inner concave portion 41 of the reservoir portion 4, so as to entirely wrap the outside of the reservoir portion 4, thereby reducing a possibility of failure of the reservoir portion 4 due to collision.

The protection portion 5 is configured to protect the reservoir portion 4, to prevent that the reservoir portion 4 is deformed and damaged due to collision.

In some embodiments, the protection portion 5 has a hardness higher than that of the reservoir portion 4. The protection portion 5 entirely covers the reservoir portion 4. The protection portion 5 effectively prevents the external force from damaging the reservoir portion 4.

Next, referring to FIGS. 12 to 14, some specific implementations of the reservoir cavity 10 formed inside the case 1 will be described.

Referring to FIG. 12, the second case 1 comprises a case body 141 and a carrier 142 disposed inside the case body 141. The carrier 142 divides the internal space of the case 14 into the accommodating cavity 11 and the reservoir cavity 10. The carrier 142 is provided with a drain hole 12, and the battery module 2 is mounted on the carrier 142. Both the blocking member 3 and the battery module 2 are mounted to the carrier 142, and the drain hole 12 is also disposed in the carrier 142. For the structure of the blocking member 3, please refer to the above introduction, which will not be described in detail here. When the reservoir cavity 10 is formed inside the case 1, the case 1 itself is required to be hermetic, such that foreign moisture and liquid do not enter the case 1.

The carrier 142 is, for example, flat shaped. The carrier 142 is welded or bolted to the inner wall of the case 1. The above-described structure makes a more compact and lightweight structure of the battery pack.

The functions of the accommodating cavity 11 and the reservoir cavity 10 are the same as those introduced above. The accommodating cavity 11 is configured to mount the battery module 2. The reservoir cavity 10 is configured to store liquid leaking from the accommodating cavity 11. Please refer to the above-described for other content.

The bottom of the case 1 is provided with an inner concave area, and the carrier 142 is mounted at an edge of the inner concave area 16. The inner concave area 16 is a part of the case 1. The above-described arrangement is used to simplify the machining, and make a stable and reliable structure of the reservoir cavity 10.

The exterior of the reservoir cavity 10 is provided with a protection portion 5 for covering the outer wall of the reservoir cavity 10.

The protection portion 5 has a hardness higher than that of the outer wall of the reservoir cavity 10. The protection portion 5 is configured to protect the outer wall of the reservoir cavity 10 to reduce a possibility of a leakage risk of the reservoir cavity 10 in the event of a collision or the like, and to ensure normal use of the battery pack.

It will be understood that, in the above-described various embodiments, as long as they are not contradictory, it is possible to refer to or combine the relevant content of the remaining embodiments, so as to implement that the reservoir cavity 10 is partially located inside the case 1 and partially located outside the case 1.

Finally, it should be noted that the above embodiments are only used to illustrate the technical solutions of the present disclosure rather than limiting the same; although the present disclosure has been described in detail with reference to the foregoing embodiments, those skilled in the art should understand that, they may still amend the technical solutions recited in the foregoing various embodiments, or make equivalent replacement to partial technical features therein. However, such amendments or replacements do not make the essence of the corresponding technical solutions depart from the spirit and scope of the technical solutions of the various embodiments of the present disclosure.

The invention claimed is:

1. A battery pack, comprising:
    a case (1), comprising an accommodating cavity (11) and drain holes (12) in communication with the accommodating cavity (11);
    a battery module (2) contained inside the accommodating cavity (11), the battery module (2) being fixed onto an inner wall of the case (1) by binder; the battery module (2) comprises a battery cell assembly (21) and a cooling system (22); the battery cell assembly (21) comprises a plurality of battery cells (210) arranged side by side; the plurality of battery cells (210) are electrically connected to each other; the cooling system (22) abuts against the plurality of battery cells (210); the cooling system (22) comprises a cooling plate (221) and two connecting pipes (222), the two connecting pipes (222) are respectively located on both sides of the battery module (2) in a length direction; the drain holes (12) are provided in one or more rows below a connection position of each of the two connecting pipes (222) and the cooling plate (221); and
    a blocking member (3), mounted to the case (1) and located between the drain holes (12) and the battery module (2) on a lateral plane to block the binder for fixing the battery module (2) from entering the drain holes (12),
    wherein the blocking member (3) is provided adjacent to an end of the battery module (2) in the length direction, the drain holes (12) being positioned to the side of the blocking member (3) away from the battery module (2) in the length direction,
    wherein a reservoir cavity (10) is provided below the battery module (2) to store a liquid, such that the reservoir cavity (10) is in communication with the drain holes (12), and
    wherein for each of the drain holes (12) a dimension at one end of the drain hole (12) in communication with the accommodating cavity (11) is greater than a dimension at other end of the drain hole (12) in communication with the reservoir cavity (10).

2. The battery pack according to claim 1, wherein the blocking member (3) is located outside the battery module (2) along a length direction.

3. The battery pack according to claim 1, wherein the blocking member (3) and the drain hole (12) are disposed at a same wall (15) of the case (1).

4. The battery pack according to claim 1, wherein the blocking member (3) comprises:
    a connecting plate (31) fixedly connected to the case (1); and
    an upright plate (32) connected to the connecting plate (31), wherein the upright plate (32) extends along a height direction of the battery module (2).

5. The battery pack according to claim 4, wherein the connecting plate (31) and the upright plate (32) are integral.

6. The battery pack according to claim 4, wherein the connecting plate (31) and the upright plate (32) are connected to form an L-shaped plate.

7. The battery pack according to claim 1, wherein the blocking member (3) has a length of L1, and there is a farthest distance of L2 between a side wall of a first drain hole (121) and a side wall of a second drain hole (122), wherein L1 is greater than L2;
    wherein the first drain hole (121) and the second drain hole (122) are two of the drain holes (12) located at both ends of a row of drain holes (12) adjacent to an end of the battery module in a length direction; and
    wherein the blocking member (3) is configured to block a binder for fixing the battery module from entering the drain hole (12) in a width direction of the case (1).

8. The battery pack according to claim 1, wherein a second blocking member (3) is provided adjacent to an opposing end of the battery module (2) in the length direction.

9. The battery pack according to claim 1,
    wherein the battery pack further comprises a reservoir portion (4) disposed outside the case (1); and
    wherein the reservoir portion (4) is provided with the reservoir cavity (10), or the reservoir portion (4) and the case (1) jointly form the reservoir cavity (10).

10. The battery pack according to claim 9, wherein the reservoir portion (4) is mounted below a wall (15) of the case (1) and is sealingly connected with the wall (15); and wherein the reservoir portion (4) and the wall (15) enclose the reservoir cavity (10).

11. The battery pack according to claim 10, wherein the reservoir portion (4) is provided with an inner concave portion (41) recessed in a direction away from the case (1).

12. The battery pack according to claim 11, wherein there are a plurality of the drain holes (12), and the inner concave portion (41) is located outside all of the drain holes (12) and covers all of the drain holes (12).

13. The battery pack according to claim 9, further comprising:
   a protection portion (5) mounted on one side of the reservoir portion (4) away from the case (1).

14. The battery pack according to claim 13, wherein the protection portion (5) has a hardness greater than that of the reservoir portion (4), and the protection portion (5) entirely covers the reservoir portion (4).

15. The battery pack according to claim 1, wherein the case (1) comprises:
   a first case (13); and
   a second case (14) enclosing the accommodating cavity (11) with the first case (13) and located below the first case (13); wherein the drain hole (12) is disposed in the second case (14).

16. The battery pack according to claim 1, wherein all the drain hole (12) are arranged along a width direction of the case (1).

17. The battery pack according to claim 1, wherein the battery module (2), the drain hole (12), and the blocking member (3) are spaced apart from one another and the blocking member (3) is located between the drain hole (12) and the battery module (2) such that the blocking member (3) completely separates the drain holes (12) and the battery module (2) to block a binder for fixing the battery module (2) from entering the drain hole (12).

* * * * *